United States Patent [19]

Fukui et al.

[11] Patent Number: 5,708,488
[45] Date of Patent: Jan. 13, 1998

[54] PHASE TYPE SPATIAL LIGHT MODULATOR HAVING AN OUTPUT SUBSTANTIALLY UNIFORM IN AMPLITUDE

[75] Inventors: Atsushi Fukui; Kanji Nishii, both of Osaka; Masami Ito, Moriguchi, all of Japan

[73] Assignee: Matsushita Electric Industrial Co., Ltd., Osaka-fu, Japan

[21] Appl. No.: 735,211

[22] Filed: Oct. 22, 1996

Related U.S. Application Data

[63] Continuation of Ser. No. 132,347, Oct. 6, 1993, abandoned.

[30] Foreign Application Priority Data

Oct. 7, 1992 [JP] Japan ..................... 4-267741

[51] Int. Cl.[6] .................. G02F 1/1347; G02F 1/1335
[52] U.S. Cl. ............................... 349/76; 349/117
[58] Field of Search ........................ 359/53, 73, 78, 359/93; 349/74, 76, 77, 81, 117, 132, 75

[56] References Cited

U.S. PATENT DOCUMENTS

| 4,952,010 | 8/1990 | Healey et al. ............... 359/11 |
| 5,044,732 | 9/1991 | Kimura et al. ............... 359/53 |
| 5,061,045 | 10/1991 | Yoneya et al. ............... 359/56 |
| 5,121,231 | 6/1992 | Jenkins et al. ............... 359/7 |
| 5,126,868 | 6/1992 | Kazaki et al. ............... 359/86 |
| 5,182,665 | 1/1993 | O'Callaghan et al. ........... 359/95 |

FOREIGN PATENT DOCUMENTS

| 0 153 147 | 8/1985 | European Pat. Off. . |
| 2-204725 | 8/1990 | Japan . |
| 3-257419 | 11/1991 | Japan . |
| 3-276122 | 12/1991 | Japan . |
| 4-204828 | 7/1992 | Japan . |
| 4-226426 | 8/1992 | Japan . |

OTHER PUBLICATIONS

Yocky et al., "Simple . . . phase-only light modulators", OPTIK, vol. 84, No. 4, 1990, pp. 140–144 no month.

Barnes et al., "Phase Only . . . Optical Correlation System", SPIE, Optical Pattern Recognition II, vol. 1134, 1989, pp. 204–208, no month.

Barnes et al., "Phase Only modulation using a twisted nematic liquid crystal Television", Applied Optics, vol. 28, No. 22, Nov. 15, 1989, pp. 4845–4852.

(List continued on next page.)

*Primary Examiner*—William L. Sikes
*Assistant Examiner*—Charles Miller
*Attorney, Agent, or Firm*—Wenderoth, Lind & Ponack

[57] ABSTRACT

Phase-type spatial modulation of light is achieved by placing a twisted pneumatic liquid crystal cell between two polarizers, such that a direction of alignment of liquid crystal molecules at an input side of the liquid crystal cell is parallel to a transmission access of a first one of the polarizers, and such that a direction of alignment liquid crystal molecules at an output side of the liquid crystal cell is parallel to a transmission access of a second one of the polarizers. Also, phase modulation which is substantially free from amplitude variations can be realized by placing two twisted pneumatic liquid crystal cells between two polarizers. In such an arrangement, a direction of alignment of the liquid crystal molecules at an input side of a first liquid crystal cell is parallel to a transmission access of a first polarizer, and a direction of alignment of liquid crystal molecules at an output side of the first liquid crystal cell is perpendicular to a direction of alignment of the liquid crystal molecules at an input side of the second liquid crystal cell. The direction of alignment of the liquid crystal molecules of the second liquid crystal cell is perpendicular to a transmission access of the second polarizer. The two liquid crystal cells have identical drive voltages applied thereto, and have identical retardations and twist angles. However, the twist angle of the first liquid crystal cell is in an opposite direction to that of the second liquid crystal cell.

1 Claim, 9 Drawing Sheets

OTHER PUBLICATIONS

Davis et al., "High Efficiency optical reconstruction of binary phase-only filters using Hughes liquid crystal light valve", Applied Optics, vol. 26, No. 5, Mar. 1, 1987, pp. 929–933.

Konforti et al., "Phase-only modulation with twisted nematic liquid-crystal spatial light modulators", Optics Letters, vol. 13, No. 3, Mar. 1988, pp. 251–253.

Patent Abstracts of Japan, vol. 3, No. 127 (E–146) (54–204855) Oct. 23, 1979.

Kanghua Lu et al., "Theory and design of the liquid crystal TV as an optical spatial phase modulator", *Optical Engineering*, vol. 29, No. 3, Mar. 1990, pp. 240–246.

T. H. Barnes et al., "Optoelectronic determination of binary phase-only filters for optical correlation", *Optical Engineering*, vol. 31, No. 9, Sep. 1991, pp. 1936–1945.

D. A. Yocky et al., "Simple measurement of the phase modulation capability of liquid crystal phase-only light modulators", *Optik*, vol. 84, No. 4, Apr. 1990, pp. 140–144.

PHASE TYPE SPATIAL LIGHT MODULATOR HAVING AN OUTPUT SUBSTANTIALLY UNIFORM IN AMPLITUDE

This application is a Continuation of now abandoned application Ser. No. 08/132,347, filed Oct. 6, 1993.

BACKGROUND OF THE INVENTION

The present invention relates to a phase type spatial light modulator for use in an optical information processor in a visual apparatus for an industrial robot or the like, which optical information processor performs image processings such as filtering and extraction of features in a spatial frequency region of an input image, a processing for identifying, from a plurality of input patterns, one or more input patterns coincident with a specific standard pattern, etc.

An arrangement and operation of a known optical information processor described in Japanese Patent Laid-Open Publication No. 2-132412 (1990) are described with reference to FIG. 11, hereinbelow. In FIG. 11, a collimator lens 2 converts a ray from a laser diode 1 into collimated rays and a liquid crystal display 13 displays an image shot by a television (TV) camera 3. The liquid crystal display 13 is disposed at a front focal surface of a lens 6 having a focal length f1 and a memory 8 stores holographic data of a Fourier transformation computer. A liquid crystal display 14 for displaying the data stored in the memory 8 is disposed at a rear focal surface of the lens 6. Meanwhile, the liquid crystal display 14 is also disposed at a front focal surface of a lens 11 having a focal length f2 and a photoelectric converter 12 is disposed at a rear focal surface of the lens 11.

Interrelation among the above mentioned constituent elements of the known optical information processor and operation of the known optical information processor are as follows. A pattern of a target subject displayed by the liquid crystal display 13 is irradiated by a coherent ray from the laser diode 1. This image of the target subject is optically converted by the lens 6 and a Fourier transformed image of the target subject is formed on the liquid crystal display 14. At this time, a Fourier transformed image of a standard pattern stored in the memory 8 is displayed by the liquid crystal display 14. Thus, output light from the liquid crystal display 14 is formed by an optical product of two Fourier transformed images of the target subject and the specific standard pattern. Since the liquid crystal display 14 is disposed at the front focal surface of the lens 11, this image is subjected to reverse Fourier transformation by the lens 11. When the Fourier transformed images of the target subject and the standard pattern have coincided with each other, a bright point is produced on the rear focal surface of the lens 11 and is detected by the photoelectric converter 12. Thus, the known optical information processor performs optical correlation processing in which an optical filter based on the computer hologram displayed on the liquid crystal display 14 functions as a matched filter.

FIG. 12 shows an actual construction of the liquid crystal displays 13 and 14 of FIG. 11. In FIG. 12, a liquid crystal cell 16 is formed by twisted nematic (TN) liquid crystal and is interposed between polarizers 15 and 17 whose transmission axes are parallel to each other. The transmission axis of the polarizer 15 is substantially parallel to a direction of alignment of liquid crystal molecules at an input side of the liquid crystal cell 16.

FIG. 13 shows relations among directions of alignment of liquid crystal molecules of the liquid crystal cell 16 and directions of the transmission axes of the polarizers 15 and 17. In FIG. 13, reference numeral 50 denotes a direction of alignment of liquid crystal molecules at an output side of the liquid crystal cell 16, reference numeral 51 denotes a direction of alignment of liquid crystal molecules at an input side of the liquid crystal cell 16 and reference numeral 52 denotes the direction of the transmission axis of the polarizer 15. Furthermore, reference numeral 53 denotes the direction of the transmission axis of the polarizer 17 and reference numeral 54 denotes a twist angle of the liquid crystal cell 16.

When no voltage is applied to the liquid crystal cell 16, direction of polarization of output light from the polarizer 15 is rotated through nearly 90° by the liquid crystal cell 16 and thus, the output light from the polarizer 15 is intercepted by the polarizer 17. When a voltage is applied to the liquid crystal cell 16, twist of the TN liquid crystal cell 16 is eliminated and rotation of polarized light is reduced, thereby resulting in an increase of the light component in the direction of the transmission axis of the polarizer 17. Therefore, the liquid crystal displays 13 and 14 function as amplitude modulating elements.

FIG. 14 shows a configuration of the computer hologram displayed on the liquid crystal display 14 shown in FIG. 11. Since the liquid crystal display 14 is the amplitude modulating element, it becomes possible to not only modulate the phase component of input light by selecting on a cell 60 the position of pixel groups 55 to 58 transmitting light therethrough, but also to modulate amplitude component of the input light by controlling the number of the selected pixel groups. Therefore, the liquid crystal display 14 is capable of acting as a medium for displaying the computer hologram and can execute optical information processings such as pattern matching.

However, in the above described arrangement of the known optical information processor, since the liquid crystal display 14 is the amplitude modulating element, phase component of input light is modulated by changing spatial position of the light transmitting pixel groups. Hence, the cell should be arranged such that a plurality of pixels correspond to one sample point. Namely, utilization efficiency of pixels in the liquid crystal cell is low and the number of pixels which can be subjected to batch processing is lessened.

SUMMARY OF THE INVENTION

Accordingly, an essential object of the present invention is to provide, with a view to eliminating the above mentioned drawbacks of conventional optical information processors, a phase type spatial light modulator in which one sample point of a hologram is expressed by one pixel through phase modulation such that the number of pixels for batch processing is increased.

In order to accomplish this object of the present invention, a phase type spatial light modulator according to a first embodiment of the present invention comprises: a first polarizer; a coherent light source for irradiating the first polarizer; a liquid crystal cell for receiving output light from the first polarizer, at an input side of which a direction of alignment of liquid crystal molecules is parallel to a transmission axis of the first polarizer; and a second polarizer for receiving output light from the liquid crystal cell, which has a transmission axis parallel to a direction of alignment of liquid crystal molecules at an output side of the liquid crystal cell.

Meanwhile, a phase type spatial light modulator according to a second embodiment of the present invention comprises: a first polarizer; a coherent light source for irradiating the first polarizer; a first liquid crystal cell for receiving output light from the first polarizer, at an input side of which a direction of alignment of liquid crystal molecules is parallel to a transmission axis of the first polarizer; a second liquid crystal cell for receiving output light from the first liquid crystal cell, at an input side of which a direction of alignment of liquid crystal molecules is perpendicular to a direction of alignment of liquid crystal molecules at an output side of the first liquid crystal cell and which has a retardation and a twist angle substantially equal to those of the first liquid crystal cell such that a twist direction of liquid crystal molecules of the second liquid crystal cell is opposite to that of the first liquid cell; and a second polarizer for receiving output light from the second liquid crystal cell, which has a transmission axis perpendicular to a direction of alignment of liquid crystal molecules at an output side of the second liquid crystal cell.

Furthermore, a phase type spatial light modulator according to a third embodiment of the present invention comprises: a polarizer; a coherent light source for irradiating the polarizer; and a liquid crystal cell for receiving output light from the polarizer, whose direction of homogeneous alignment of liquid crystal molecules is parallel to a transmission axis of the polarizer.

As described above, the direction of alignment of liquid crystal molecules at the input side of the liquid crystal cell is made parallel to the transmission axis of the first polarizer and the direction of alignment of liquid crystal molecules at the output side of the liquid crystal cell is made parallel to the transmission axis of the second polarizer in the first embodiment. Meanwhile, in the second embodiment, the direction of alignment of liquid crystal molecules at the input side of the first liquid crystal cell is made parallel to the transmission axis of the first polarizer, the direction of alignment of liquid crystal molecules at the output side of the first liquid crystal cell is made perpendicular to the direction of alignment of liquid crystal molecules at the input side of the second liquid crystal cell and the direction of alignment of liquid crystal molecules at the output side of the second liquid crystal cell is made perpendicular to the transmission axis of the second polarizer. Furthermore, in the third embodiment, the direction of homogeneous alignment of liquid crystal molecules of the liquid crystal cell is made parallel to the transmission axis of the polarizer.

By the above described arrangements of the phase type spatial light modulator of the present invention, change of optical path length can be increased relative to effective change of refractive index of the liquid crystal upon application of voltage thereto and thus, phase modulation can be performed.

Moreover, when this phase type spatial light modulator is incorporated into an optical information processor, the number of pixels for batch processing can be increased in the optical information processor.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
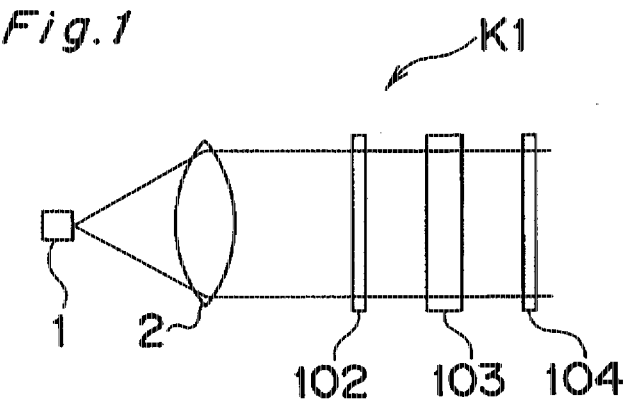
FIG. 1 is a schematic view of a phase type spatial light modulator according to a first embodiment of the present invention.
Figure 2:
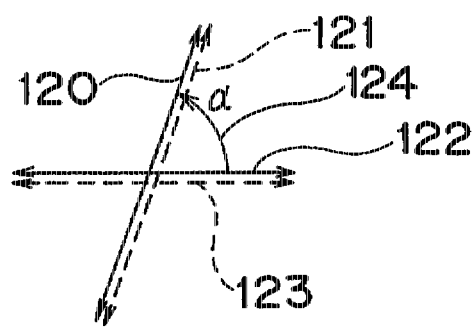
FIG. 2 is a view showing relations among directions of transmission axes of polarizers and directions of alignment of liquid crystal molecules of a liquid crystal cell in the spatial light modulator of FIG. 1.

Hereinbelow, an arrangement and operation of a phase type spatial light modulator K1 according to a first embodiment of the present invention are described with reference to FIGS. 1 to 3. As shown in FIG. 1, the spatial light modulator K1 includes a laser diode 1, a collimator lens 2 for converting a ray from the laser diode 1 into collimated rays, first and second polarizers 102 and 104 and a liquid crystal cell 103. FIG. 2 shows relations among directions of alignment of liquid crystal molecules of the liquid crystal cell 103 and directions of transmission axes of the first and second polarizers 102 and 104.

In FIG. 1, the liquid crystal cell 103 is formed by a TN liquid crystal cell. The transmission axis of the first polarizer 102 is parallel to the direction of alignment of liquid crystal molecules at an input side of the liquid crystal cell 103, while the transmission axis of the second polarizer 104 is parallel to the direction of alignment of liquid crystal molecules at an output side of the liquid crystal cell 103.

In FIG. 2, reference numeral 120 denotes the direction of alignment of liquid crystal molecules at the output side of the liquid crystal cell 103, reference numeral 121 denotes the direction of the transmission axis of the second polarizer 104 and reference numeral 122 denotes the direction of alignment of liquid crystal molecules at the input side of the liquid crystal cell 103. In addition, reference numeral 123 denotes the direction of the transmission axis of the first polarizer 102 and reference numeral 124 denotes a twist angle of the liquid crystal cell 103.

Next, phase modulation by the TN liquid crystal cell 103 and the first and second polarizers 102 and 104 is described. Linearly polarized light outputted from the first polarizer 102 is incident upon the input side of the TN liquid crystal cell 103 in parallel with the direction 122 of alignment of liquid crystal molecules at the input side of the liquid crystal cell 103. Thus, as a result of the birefringent property and twisted structure of liquid crystal molecules of the liquid crystal cell 103, elliptically polarized light is obtained in which a major axis is rotated relative to the transmission axis of the first polarizer 102.

Liquid crystal molecules possess a uniaxial birefringent property and have an optical axis in a direction of their major axis. When not only input light applied to the liquid crystal cell is perpendicular to the optical axis, but also the vibratory plane of the input light is parallel to the optical axis, refractive index assumes a maximum value. On the contrary, when an angle of the input light relative to the optical axis of liquid crystal molecules deviates from 90°, refractive index becomes smaller. Meanwhile, when the vibratory plane of the input light deviates from a direction parallel to the optical axis of liquid crystal molecules, refractive index is reduced.

Furthermore, liquid crystal molecules have anisotropy in dielectric constant. Thus, when an electric field is applied to the liquid crystal cell in a direction of thickness of the liquid crystal cell, the direction of liquid crystal molecules changes to the direction of the electric field, i.e. the direction of thickness of the liquid crystal cell. Therefore, the direction of the optical axis of liquid crystal molecules also changes to the direction of thickness of the liquid crystal cell, so that refractive index of the liquid crystal cell relative to the input light is reduced and thus, rotation of the major axis of elliptically polarized light of transmitted light is reduced. As a result, the quantity of light transmitted through the polarizer 104 is lessened. However, in a region of low voltage applied to the liquid crystal cell, change of the refractive index of the liquid crystal cell in the direction of the optical axis of the input light appears conspicuously relative to rotational change of the major axis of the elliptically polarized light of the transmitted light. Phase change of light is proportional to change of optical path length, i.e., product of the refractive index and the thickness of the liquid crystal cell. Optical path length of light transmitted through the liquid crystal cell assumes a maximum value when the light is parallel to the optical axis of liquid crystal molecules. Accordingly, due to change of the refractive index of the liquid crystal cell relative to the input light upon application of voltage to the liquid crystal cell, transmitted light parallel to the direction of liquid crystal molecules has a maximum phase change. Therefore, when the directions of the transmission axes of the polarizers are, respectively, made parallel to the directions of alignment of liquid crystal molecules confronting the polarizers, change of optical path length of the transmitted light at the time of application of voltage to the liquid crystal cell can be increased, thus resulting in increase of phase change.

Figure 3:
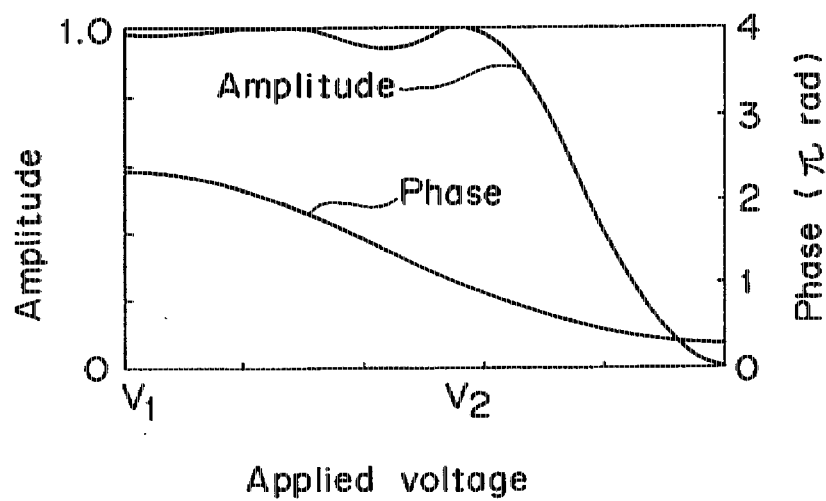
FIG. 3 is a graph showing optical characteristics of liquid crystal of the liquid crystal cell of FIG. 2.

FIG. 3 shows phase and amplitude characteristics of the TN liquid crystal cell 103 at the time of application of voltage thereto. In a range of a voltage V1 to a voltage V2 applied to the liquid crystal cell, change of refractive index of the liquid crystal cell is large relative to rotational change of elliptically polarized light from the liquid crystal cell in the direction of its major axis. Thus, since the amount of variations of amplitude is reduced and the amount of phase modulation is increased, it becomes possible to perform phase modulation by the TN liquid crystal cell 103 and the first and second polarizers 102 and 104. Meanwhile, supposing that the amount of amplitude variations is 6% at a wavelength of 514.5 nm, a liquid crystal retardation of 1.2 μm and a twist angle of 90°, the amount of phase modulation is 3.1 πrad.

Meanwhile, it is needless to say that an optical element which does not change polarization state, for example, a mirror, a lens or the like may be further provided between the polarizer 102 and the liquid crystal cell 103 or between the liquid crystal cell 103 and the polarizer 104.

Figure 4:
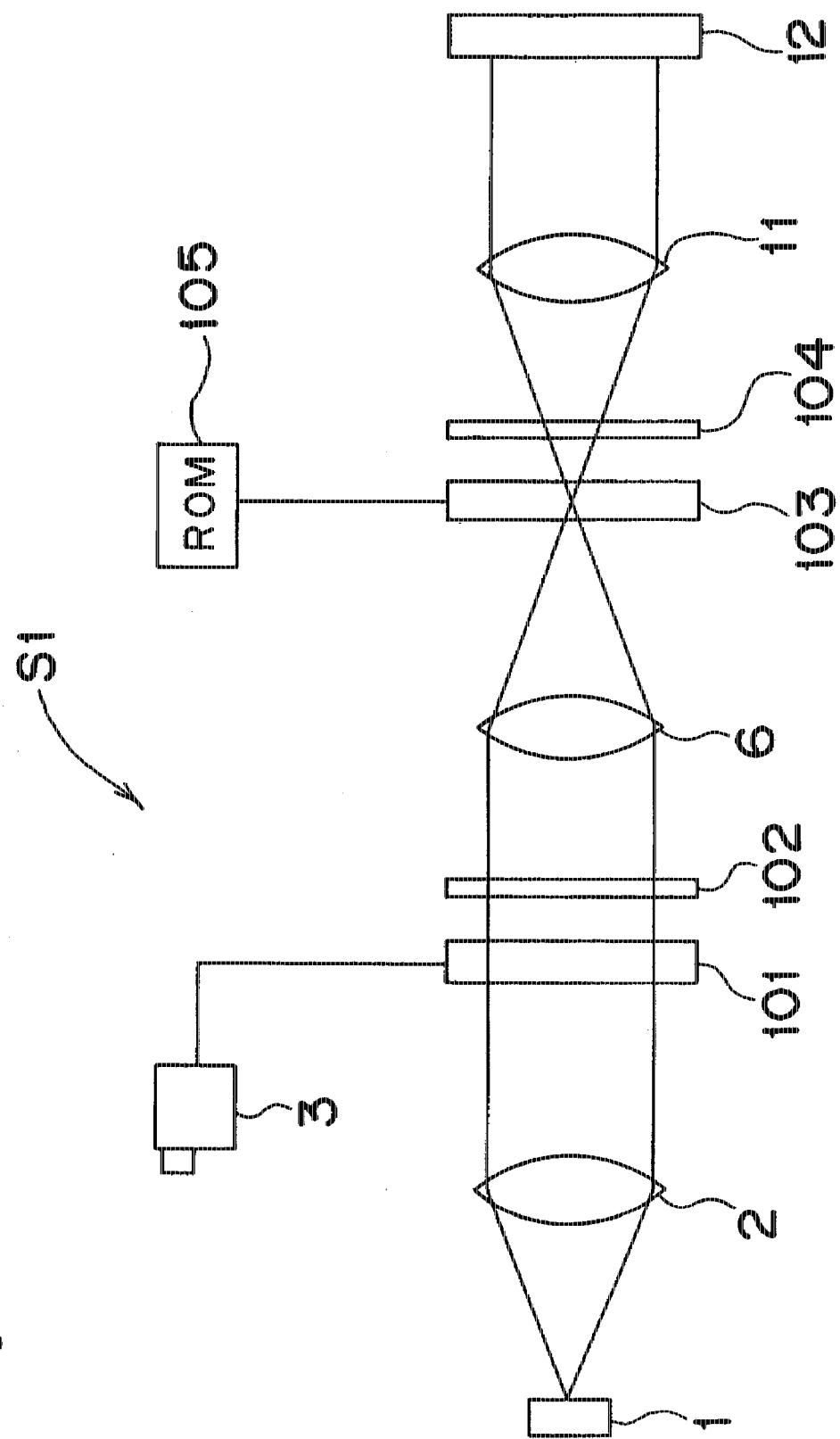
FIG. 4 is a schematic view of an optical information processor employing the spatial light modulator of FIG. 1.

An optical information processor S1 employing the phase type spatial light modulator K1 is described with reference to FIG. 4, hereinbelow. The optical information processor S1 includes the laser diode 1, the collimator lens 2, a TV camera 3, a lens 6, a liquid crystal cell 101 disposed at a front focal surface of the lens 6, the first polarizer 102 disposed at an output side of the liquid crystal cell 101, the TN liquid crystal cell 103 disposed at a rear focal surface of the lens 6 and the second polarizer 104 disposed rearwards of the TN liquid crystal cell 103. Direction of alignment of liquid crystal molecules at an input side of TN liquid crystal cell 103 is parallel to the transmission axis of the first polarizer 102, while the transmission axis of the second polarizer 104 is parallel to the direction of alignment of liquid crystal molecules at an output side of the TN liquid crystal cell 103.

The optical information processor S1 further includes a memory 105 for storing a hologram formulated from phase component of a Fourier transformed image of a standard pattern, a lens 11 having a front focal surface coincident with the rear focal surface of the lens 6 and a photoelectric converter 12 disposed at a rear focal surface of the lens 11.

Next, operation of the optical information processor S1 of the above described arrangement is described. In FIG. 4, a pattern of a target subject displayed on the liquid crystal cell 101 is irradiated by coherent light from the laser diode 1. Output light from the liquid crystal cell 101 is formed into an image of the target subject by the first polarizer 102. This output light is optically converted by the lens 6 such that a Fourier transformed image of the target subject is formed on the TN liquid crystal cell 103. At this time, the Fourier transformed image of the standard pattern stored in the memory 105 is displayed on the TN liquid crystal cell 103. Output light from the TN liquid crystal cell 103 is set to an optical product of two Fourier transformed images of the target subject and the specific standard pattern by the second polarizer 104. Since the TN liquid crystal cell 103 is disposed at a front focal surface of the lens 11, this image is subjected to reverse Fourier transformation by the lens 11. When the Fourier transformed images of the target subject and the standard pattern have coincided with each other, a bright point is produced on the rear focal surface of the lens 11 and is detected by the photoelectric converter 12. Thus, the optical information processor S1 performs optical correlation processing in which an optical filter based on the computer hologram displayed on the TN liquid crystal cell 103 functions as a matched filter.

Figure 11:
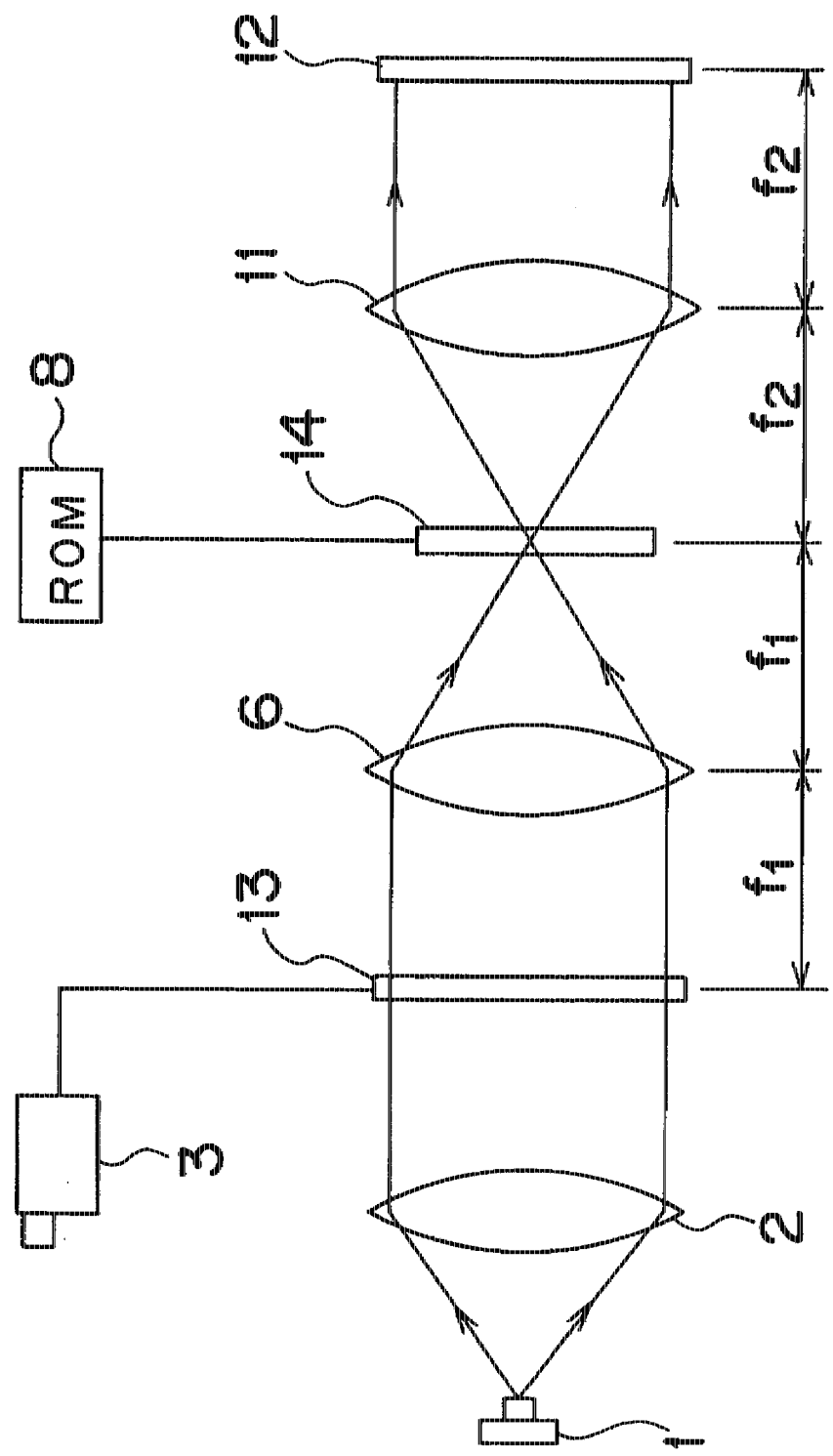
FIG. 11 is a schematic view of a prior art optical information processor (already referred to)
Figure 12:
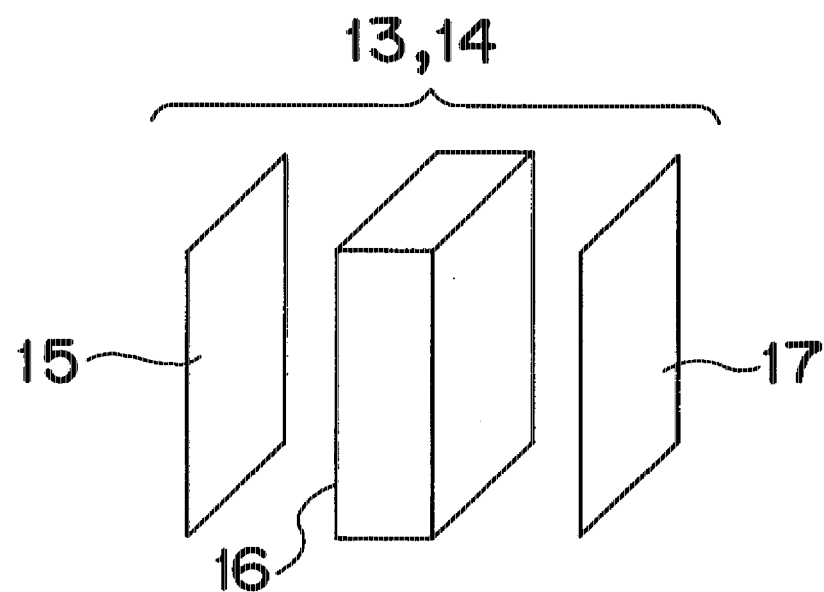
FIG. 12 is a view showing a construction of a liquid crystal display employed in the prior art optical information processor of FIG. 11 (already referred to)
Figure 13:
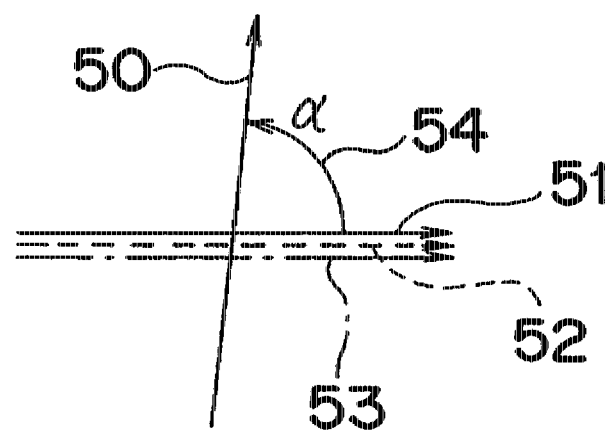
FIG. 13 is a view showing relations among directions of alignment of liquid crystal molecules of a liquid crystal cell and directions of transmission axes of polarizers in the liquid crystal display of FIG. 12 (already referred to)
Figure 14:
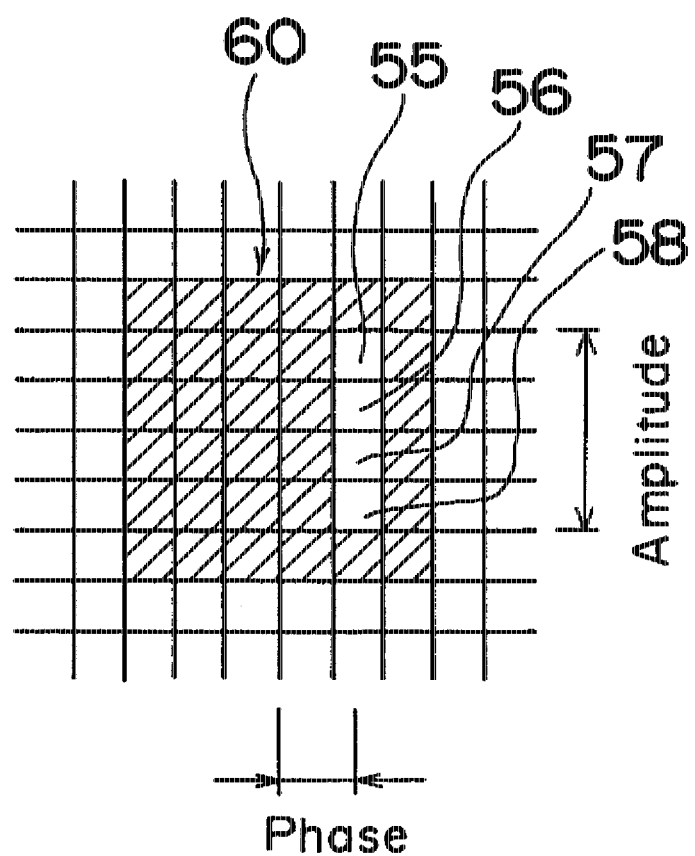
FIG. 14 is a view showing a configuration of a cell of a computer hologram displayed on the liquid crystal display of FIG. 12 (already referred to).

In a known optical information processor shown in FIG. 11, since a liquid crystal cell 14 for displaying hologram functions as an amplitude modulating element, modulation of the phase component of input light is performed by changing spatial position of pixel groups of transmitted light. Hence, a cell corresponding to one sampling point should be formed by a plurality of liquid crystal pixels. Therefore, supposing that one cell is constituted by m×n pixels and the liquid crystal cell is constituted by M×N pixels, only (M/m)×(N/n) sampling images can be handled by the known optical information processor.

In optical pattern matching, the phase component of light plays a more vital role than the amplitude component of light. Thus, even if only the phase component of light is modulated, accuracy of identification hardly deteriorates. Therefore, by employing a spatial light modulating element capable of performing phase modulation, one cell of the computer hologram can be expressed by one pixel of liquid crystal, so that the number of pixels for batch processing can be set to the number of pixels of the liquid crystal cell. Therefore, supposing that visual field is constant in a TV camera, the number of pixels forming the image of the target subject is increased so as to make the image of the target subject finer and thus, accuracy of shape recognition in pattern matching can be upgraded. Meanwhile, in this embodiment, the liquid crystal cell 103 is formed by the TN liquid crystal cell but may also be formed by a liquid crystal cell having homogeneous alignment of liquid crystal molecules.

Figure 5:
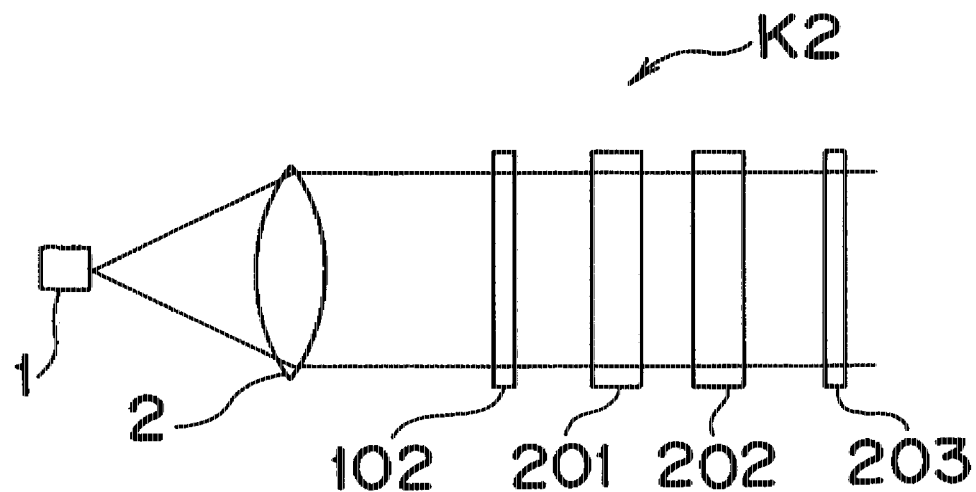
FIG. 5 is a schematic view of a phase type spatial light modulator according to a second embodiment of the present invention.
Figure 6:
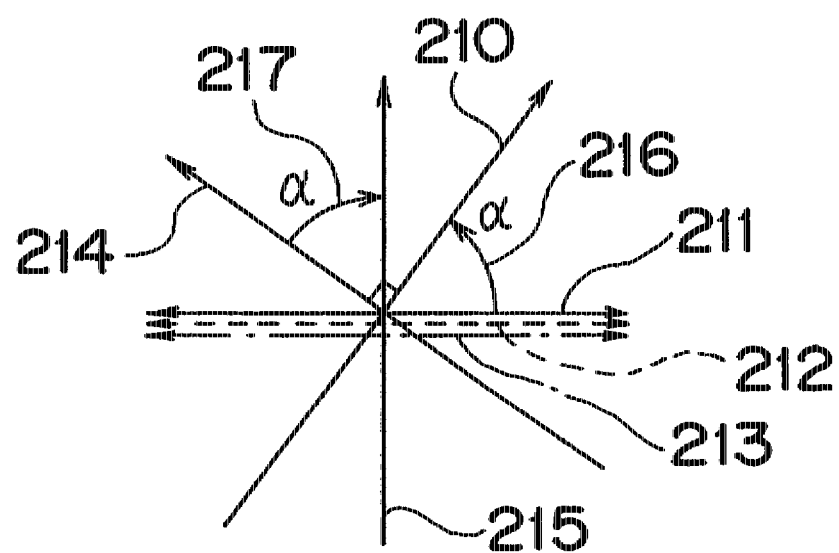
FIG. 6 is a view showing relations among directions of transmission axes of polarizers and directions of alignment of liquid crystal molecules of liquid crystal cells in the spatial light modulator of FIG. 5.

Hereinbelow, a phase type spatial light modulator K2 according to a second embodiment of the present invention is described with reference to FIGS. 5 and 6. As shown in FIG. 5, the spatial light modulator K2 includes the laser diode 1, the collimator lens 2 and the first polarizer 102 as in the spatial light modulator K1. Furthermore, the spatial light modulator K2 includes liquid crystal cells 201 and 202 and a second polarizer 203. FIG. 6 shows relations among directions of alignment of liquid crystal molecules of the liquid crystal cells 201 and 202 and directions of transmission axes of the first and second polarizers 102 and 203. In FIG. 5, the liquid crystal cell 201 is formed by TN liquid crystal and the direction of alignment of liquid crystal molecules at an input side of the liquid crystal cell 201 is parallel to the transmission axis of the first polarizer 102. The liquid crystal cell 202 is also formed by TN liquid crystal. In the liquid crystal cell 202, retardation and twist angle is equal to those of the TN liquid crystal cell 201, but the twist direction is opposite to that of the TN liquid crystal cell 201. Meanwhile, the direction of alignment of liquid crystal molecules at an input side of the TN liquid crystal cell 202 is perpendicular to the direction of alignment of liquid crystal molecules at an output side of the liquid crystal cell 201. The transmission axis of the second polarizer 203 is perpendicular to the direction of alignment of liquid crystal molecules of the TN liquid crystal cell 202.

In FIG. 6, reference numeral 210 denotes the direction of alignment of liquid crystal molecules at the output side of the liquid crystal cell 201, reference numeral 211 denotes the direction of alignment of liquid crystal molecules at the input side of the liquid crystal cell 201 and reference numeral 212 denotes the direction of the transmission axis of the first polarizer 102. Meanwhile, reference numeral 213 denotes the direction of the transmission axis of the second polarizer 203, reference numeral 214 denotes the direction of alignment of liquid crystal molecules at the input side of the liquid crystal cell 202 and reference numeral 215 denotes the direction of alignment of liquid crystal molecules at the output side of the liquid crystal cell 202. Furthermore, reference numeral 216 denotes the twist angle of the liquid crystal cell 201 and reference numeral 217 denotes the twist angle of the liquid crystal cell 202.

Next, operation of the spatial light modulator K2 of the above described arrangement is described. As a result of the birefringent property and twisted structure of liquid crystal molecules of the liquid crystal cell 201, linearly polarized light incident upon the TN liquid crystal cell 201 is changed to elliptically polarized light in which its major axis is rotated relative to the direction of the linearly polarized light incident upon the TN liquid crystal cell 201. Since retardation and twist angle of the TN liquid cell 202 are the same as those of the TN liquid crystal cell 201, but the TN liquid crystal cell 202 is twisted in a direction opposite to that of the TN liquid crystal cell 201, the elliptically polarized light outputted from the TN liquid crystal cell 201 is reversely changed to substantially linearly polarized light by the TN liquid crystal cell 202. By applying an identical voltage to the TN liquid crystal cells 201 and 202, the elliptically polarized light outputted from the TN liquid crystal cell 201 is changed to the substantially linearly polarized light by the TN liquid crystal cell 202 of reverse twist. Accordingly, intensity of output light from the polarizer 203 is made substantially constant regardless of voltage applied to the liquid crystal cells 201 and 202.

Since the refractive index of the liquid crystal cell relative to input light changes when voltage is applied to the liquid crystal cell, optical path length of light transmitted through the liquid crystal cells 201 and 202 changes, thereby resulting in phase change. Therefore, by employing the liquid crystal cell 202 twisted in the direction opposite to that of the liquid crystal cell 201, the 10 elliptically polarized light outputted from the liquid crystal cell 201 is reversely changed to the linearly polarized light by the liquid crystal cell 202 of reverse twist and thus, phase modulation having small amplitude variations can be performed.

As described above, by employing the TN liquid crystal cells 201 and 202 and the polarizer 203 in the second embodiment, effects similar to those of the first embodiment can be achieved. Furthermore, by applying an identical voltage to the liquid crystal cells 201 and 202, phase modulation having less amplitude variations can be performed. In addition, since the amount of phase modulation becomes a sum of those of the two liquid crystal cells, the amount of phase modulation at each of the liquid crystal cells can be reduced. Since the amount of phase modulation is proportional to retardation of the liquid crystal cell, thickness of the liquid crystal layer can be reduced and response speed can be raised. Meanwhile, since amplitude variations do not occur during phase modulation, range of voltage applied to the liquid crystal cell can be increased and thus, retardation of the liquid crystal cell can be reduced. Therefore, response speed can be further raised.

Meanwhile, it goes without saying that an optical element which does not change polarization state, for example, a mirror, a lens or the like may be further provided between the polarizer 102 and the liquid crystal cell 201 or between the liquid crystal cells 201 and 202 or between between the liquid crystal cell 202 and the polarizer 203.

Figure 7:
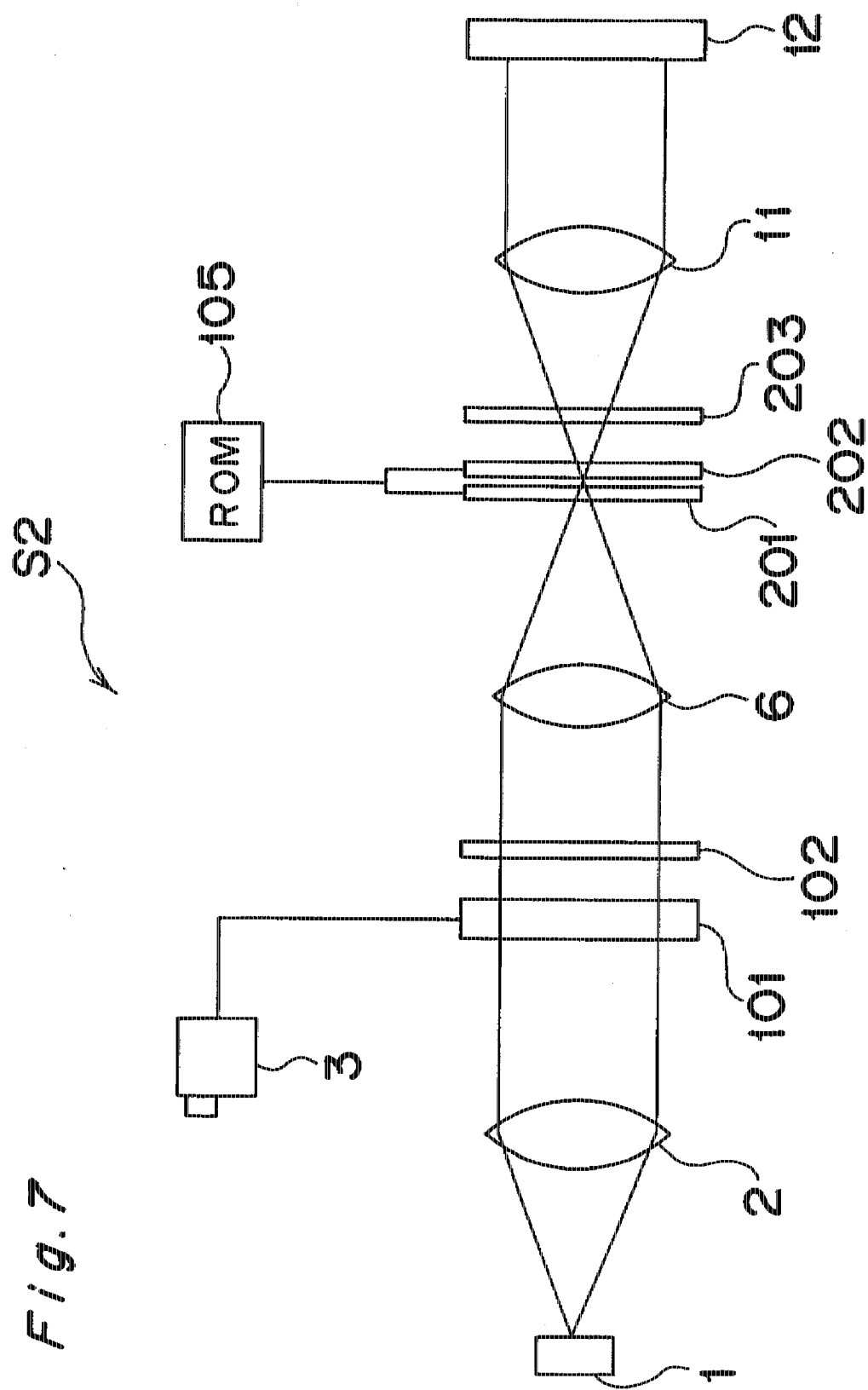
FIG. 7 is a schematic view of an optical information processor employing the spatial light modulator of FIG. 5.

An optical information processor S2 employing the phase type spatial light modulator K2 is described with reference to FIG. 7, hereinbelow. The optical information processor S2 includes the laser diode 1, the collimator lens 2, the TV camera 3, the lens 6, the liquid crystal cell 101 disposed at the front focal surface of the lens 6, the polarizer 102 disposed at the output side of the liquid crystal cell 101, the TN liquid crystal cell 201 disposed at the rear focal surface of the lens 6, the TN liquid crystal cell 202 and the polarizer 203. Direction of alignment of liquid crystal molecules at an input side of the TN liquid crystal cell 201 is parallel to the transmission axis of the polarizer 102. Retardation and twist angle of the TN liquid crystal cell 202 are equal to those of the TN liquid crystal cell 201, but the twist direction of the TN liquid crystal cell 202 is opposite to that of the TN liquid crystal cell 201. Furthermore, direction of alignment of liquid crystal molecules at an input side of the TN liquid crystal cell 202 is perpendicular to direction of alignment of liquid crystal molecules at an output side of the TN liquid crystal cell 201. Meanwhile, the transmission axis of the polarizer 203 is perpendicular to the direction of alignment of liquid crystal molecules at an output side of the TN liquid crystal cell 202.

The optical information processor S2 further includes the lens 11 having the focal front surface coincident with the rear focal surface of the lens 6, the memory 105 and the photoelectric converter 12 disposed at the rear focal surface of the lens 11.

Next, operation of the optical information processor S2 of the above described arrangement is described. In FIG. 7, a pattern of a target subject displayed on the liquid crystal cell 101 is irradiated by coherent light from the laser diode 1. Output light from the liquid crystal cell 101 is formed into an image of the target subject by the polarizer 102. This output light is optically converted by the lens 6 such that a Fourier transformed image of the target subject is formed on the TN liquid crystal cell 201. At this time, the Fourier transformed image of the standard pattern stored in the memory 105 is displayed on the TN liquid crystal cells 201 and 202. Light transmitted through the TN liquid crystal cells 201 and 202 becomes an optical product of two Fourier transformed images of the target subject and the specific standard pattern. Since the lens 11 is disposed such that the rear focal surface of the lens 6 coincides with the front focal surface of the lens 11, this image is subjected to reverse Fourier transformation by the lens 11.

When the Fourier transformed images of the target subject and the standard pattern have coincided with each other, a bright point is produced on the rear focal surface of the lens 11 and is detected by the photoelectric converter 12. Thus, the optical information processor S2 performs optical correlation processing in which an optical filter based on the computer hologram displayed on the TN liquid crystal cells 201 and 202 functions as a matched filter.

When the phase type spatial light modulator K2 is employed in the optical information processor S2, one cell of the computer hologram can be expressed by one pixel of liquid crystal in the same manner as the optical information processor S1, so that the number of pixels for batch processing can be increased and thus, accuracy of shape recognition can be upgraded.

Furthermore, in the optical information processor S2 employing the phase type spatial light modulator K2, amplitude variations due to phase modulation can be set to substantially zero. Since correlated brightness level at the photoelectric converter 12 is reduced by amplitude variations at the phase type spatial light modulator K2, the amplitude variations can be set to substantially zero and thus, drop of accuracy of shape recognition in pattern matching can be prevented. Moreover, since response speed of the phase type spatial light modulator is raised, accuracy of shape recognition can also be improved.

Figure 8:
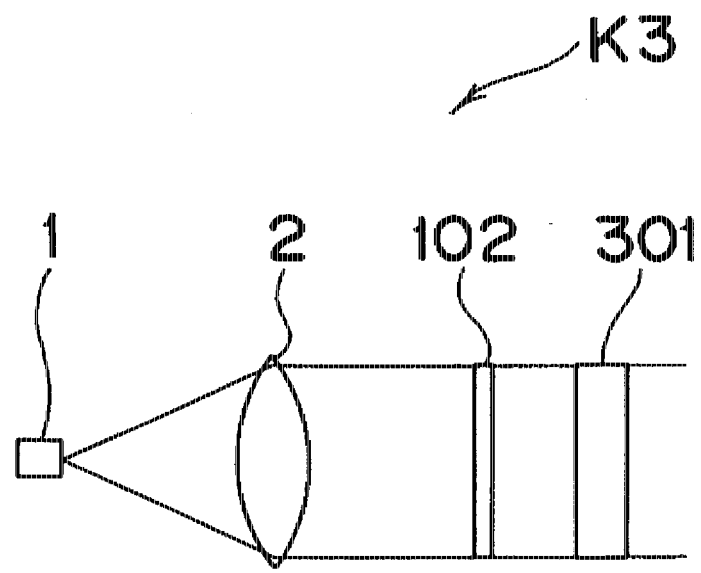
FIG. 8 is a schematic view of a phase type spatial light modulator according to a third embodiment of the present invention.
Figure 9:
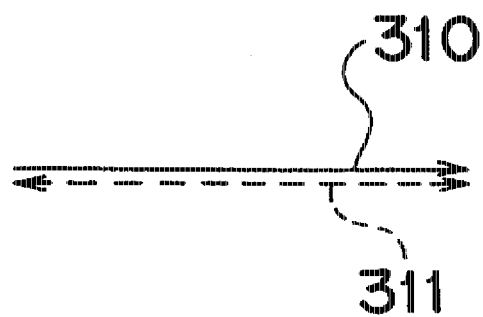
FIG. 9 is a view showing relation between a direction of a transmission axis of a polarizer and a direction of alignment of liquid crystal molecules of a liquid crystal cell in the spatial light modulator of FIG. 8.

Hereinbelow, a phase type spatial light modulator K3 according to a third embodiment of the present invention is described with reference to FIGS. 8 and 9. As shown in FIG. 8, the spatial light modulator K3 includes the laser diode 1, the collimator lens 2, the polarizer 102 and a liquid crystal cell 301. FIG. 9 shows a relation between a direction of alignment of liquid crystal molecules of the liquid crystal cell 301 and a direction of a transmission axis of the polarizer 102. In FIG. 8, the liquid crystal cell 301 has homogeneous alignment of liquid crystal molecules. Direction of homogeneous alignment of liquid crystal molecules of the liquid crystal cell 301 is parallel to the transmission axis of the polarizer 102. Meanwhile, in FIG. 9, reference numeral 310 denotes the direction of alignment of liquid crystal molecules of the liquid crystal cell 301 and reference numeral 311 denotes the direction of the transmission axis of the polarizer 102.

Next, operation of the spatial light modulator K3 of the above described arrangement is described. In the liquid crystal cell 301 having homogeneous alignment of liquid crystal molecules, direction of alignment of liquid crystal molecules at an input side of the liquid crystal cell 301 is parallel to that at an output side of the liquid crystal cell 301. Hence, when a voltage is applied to the liquid crystal cell 301, liquid crystal molecules are held in a direction parallel to the direction of alignment of liquid crystal molecules so as to change their direction towards the direction of thickness of the liquid crystal cell 301. When linearly polarized light is inputted in parallel with the direction of alignment of liquid crystal molecules at this time, the polarization state of output light does not change because liquid crystal molecules are parallel to an optical axis of the liquid crystal molecules. However, since the optical axis of the liquid crystal molecules changes towards the direction of thickness of the liquid crystal cell 301 by applying the voltage thereto, refractive index changes relative to light transmitted through the liquid crystal cell 301. As a result, optical path length changes, thereby resulting in phase change. Accordingly, phase modulation having no amplitude variation can be performed.

As described above, by employing the liquid crystal cell 301 having homogeneous alignment of liquid crystal molecules in the third embodiment, effects similar to those of the first embodiment can be obtained. Furthermore, by making the direction of alignment of liquid crystal molecules of the liquid crystal cell 301 parallel to the transmission axis of the polarizer 102 and inputting linearly polarized light in the direction of alignment of liquid crystal molecules of the liquid crystal cell 301, change of polarization state of output light can be prevented. Therefore, since a polarizer disposed rearwards of the liquid crystal cell 301 can be eliminated, damping of transmitted light by the polarizer can be prevented, so that the light source can be made compact and formed so as to produce less heat.

Figure 10:
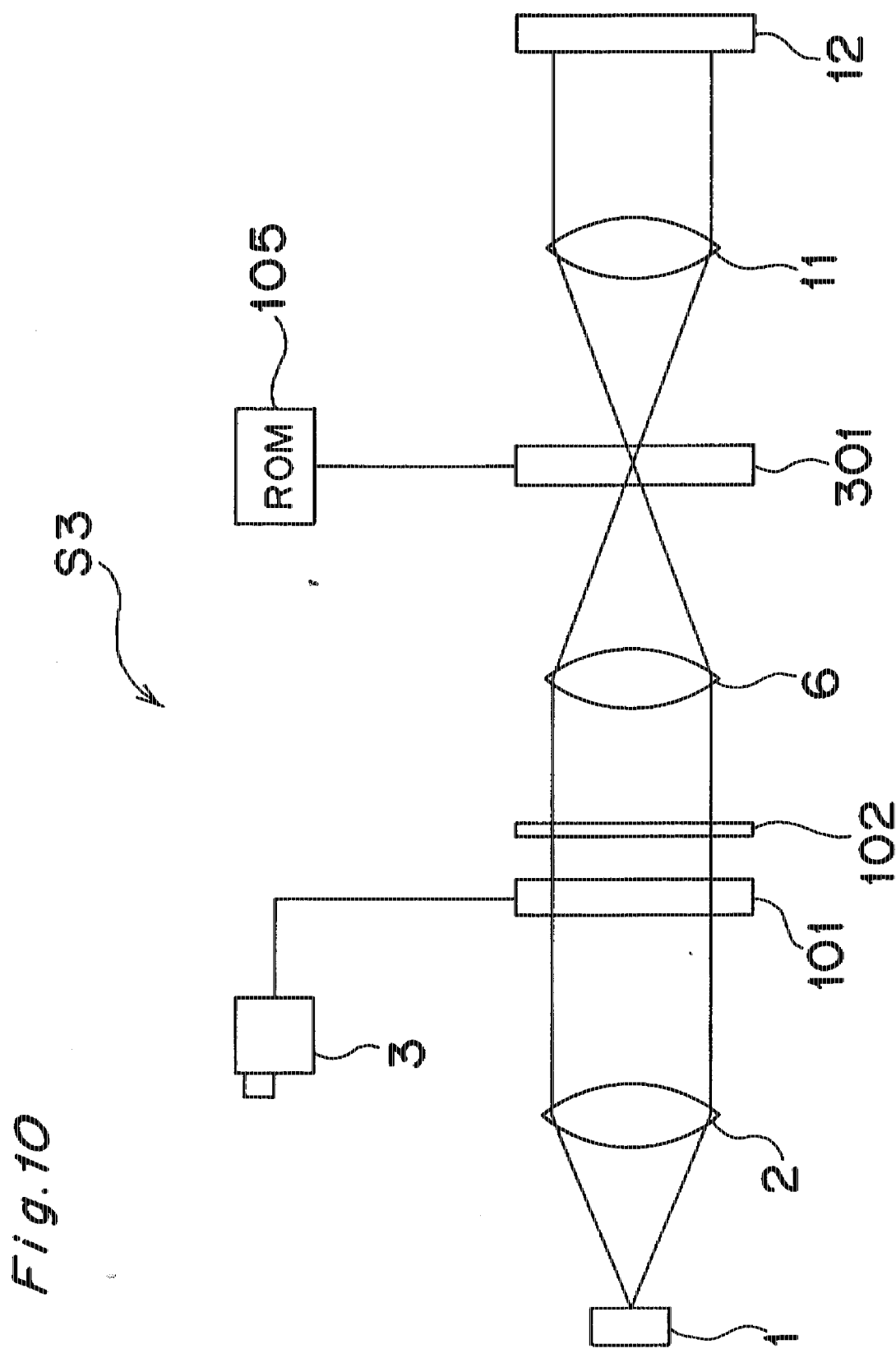
FIG. 10 is a schematic view of an optical information processor employing the spatial light modulator of FIG. 8.

FIG. 10 shows an optical information processor S3 employing the phase type spatial light modulator K3. The optical information processor S3 includes the laser diode 1, the collimator lens 2, the TV camera 3, the lens 6, the liquid crystal cell 101 disposed at the front focal surface of the lens 6, the polarizer 102 disposed at the output side of the liquid crystal cell 101 and the liquid crystal cell 301 having homogeneous alignment of liquid crystal molecules. The liquid crystal cell 301 is disposed at the rear focal surface of the lens 6. Direction of homogeneous alignment of liquid crystal molecules of the liquid crystal cell 301 is parallel to the transmission axis of the polarizer 102.

The optical information processor S3 further includes the memory 105 for storing a hologram formulated from the phase component of a Fourier transferred image of a standard pattern, the lens 11 having the front focal surface coincident with the rear focal surface of the lens 6 and the photoelectric converter 12 disposed at the rear focal surface of the lens 11.

Next, operation of the optical information processor S3 of the above described arrangement is described. In FIG. 10, a pattern of a target subject displayed on the liquid crystal cell 101 is irradiated by coherent light from the laser diode 1. Output light from the liquid crystal cell 101 is formed into an image of the target subject by the polarizer 102. This output light is optically converted by the lens 6 such that a Fourier transformed image of the target subject is formed on the liquid crystal cell 301. At this time, the Fourier transformed image of the standard pattern stored in the memory 105 is displayed on the liquid crystal cell 301. Output light from the liquid crystal cell 301 becomes an optical product of two Fourier transformed images of the target subject and the specific standard pattern. Since the liquid crystal cell 301 is disposed at a front focal surface of the lens 11, this image is subjected to reverse Fourier transformation by the lens 11. When the Fourier transformed images of the target subject and the standard pattern have coincided with each other, a bright point is produced on the rear focal surface of the lens 11 and is detected by the photoelectric converter 12. Thus, the optical information processor S3 performs optical correlation processing in which an optical filter based on the computer hologram displayed on the liquid crystal cell 301 functions as a matched filter.

When the phase type spatial light modulator K3 is employed in the optical information processor S3, one cell of the computer hologram can be expressed by one pixel of liquid crystal in the same manner as the optical information processor S1, so that the number of pixels for batch processing can be increased and thus, accuracy of shape recognition can be upgraded. Furthermore, in the optical information processor S3 employing the phase type spatial light modulator K3, since the light source can be made compact and formed so as to generate less heat, the optical information processor S3 as a whole can be made compact and thermal distortion of the optical system can be lessened, thereby resulting in prevention of drop of accuracy of shape recognition.

As will be seen from the foregoing description, the phase type spatial light modulator according to the first embodiment of the present invention comprises the first polarizer, the coherent light source for irradiating the first polarizer, the liquid crystal cell for receiving the output light from the first polarizer, at the input side of which the direction of alignment of liquid crystal molecules is parallel to the transmission axis of the first polarizer and the second polarizer for receiving the output light from the liquid crystal cell, which has the transmission axis parallel to the direction of alignment of liquid crystal molecules at the output side of the liquid crystal cell.

Meanwhile, the phase type spatial light modulator according to the second embodiment of the present invention comprises the first polarizer, the coherent light source for irradiating the first polarizer, the first liquid crystal cell for receiving output light from the first polarizer, at the input side of which the direction of alignment of liquid crystal molecules is parallel to the transmission axis of the first polarizer, the second liquid crystal cell for receiving output light from the first liquid crystal cell, at the input side of which the direction of alignment of liquid crystal molecules is perpendicular to the direction of alignment of liquid crystal molecules at the output side of the first liquid crystal cell and which has the retardation and the twist angle substantially equal to those of the first liquid crystal cell such that a twist direction of liquid crystal molecules of the second liquid crystal cell is opposite to that of the first liquid cell and the second polarizer for receiving output light from the second liquid crystal cell, which has the transmission axis perpendicular to the direction of alignment of liquid crystal molecules at the output side of the second liquid crystal cell.

Furthermore, the phase type spatial light modulator according to the third embodiment of the present invention comprises the polarizer, the coherent light source for irradiating the polarizer and the liquid crystal cell for receiving output light from the polarizer, whose direction of homogeneous alignment of liquid crystal molecules is parallel to the transmission axis of the polarizer.

Consequently, since phase modulation having less amplitude variations can be performed by the spatial light modulator of the present invention, one sampling point of the hologram can be expressed by one pixel and thus, the number of pixels for batch processing can be increased.

What is claimed is:

1. A phase type spatial light modulator comprising:

a first polarizer;

a coherent light source for irradiating the first polarizer;

a first liquid crystal cell having a first drive voltage applied thereto and having a first retardation and a first twist angle in a first twist direction for receiving output light from the first polarizer, wherein a direction of alignment of liquid crystal molecules at an input side of the first liquid crystal cell is parallel to a transmission axis of the first polarizer;

a second liquid crystal cell having a second drive voltage applied thereto and having a second retardation and a second twist angle in a second twist direction for receiving output light from the first liquid crystal cell, wherein a direction of alignment of liquid crystal molecules at an input side of the second liquid crystal cell is perpendicular to a direction of alignment of liquid crystal molecules at an output side of the first liquid crystal cell, wherein the first retardation and the first twist angle are respectively substantially equal to the second retardation and the second twist angle, and wherein the first twist direction is opposite to the second twist direction; and a second polarizer for receiving output light from the second liquid crystal cell, wherein a transmission axis of the second polarizer is perpendicular to a direction of alignment of liquid crystal molecules at an output side of the second liquid crystal cell;

wherein the first drive voltage is substantially identical to the second drive voltage such that a change in intensity of light output from said second polarizer is substantially zero.

* * * * *